March 25, 1952     C. L. MUZZEY     2,590,199
PROPELLER PITCH CONTROL APPARATUS
Filed June 8, 1946     4 Sheets-Sheet 1

INVENTOR
Clifford L. Muzzey
BY
Spencer Hardman & Fehr
his ATTORNEYS

March 25, 1952 C. L. MUZZEY 2,590,199
PROPELLER PITCH CONTROL APPARATUS
Filed June 8, 1946 4 Sheets-Sheet 2

INVENTOR.
Clifford L. Muzzey
BY Spencer Hardman & Fehr
his ATTORNEYS

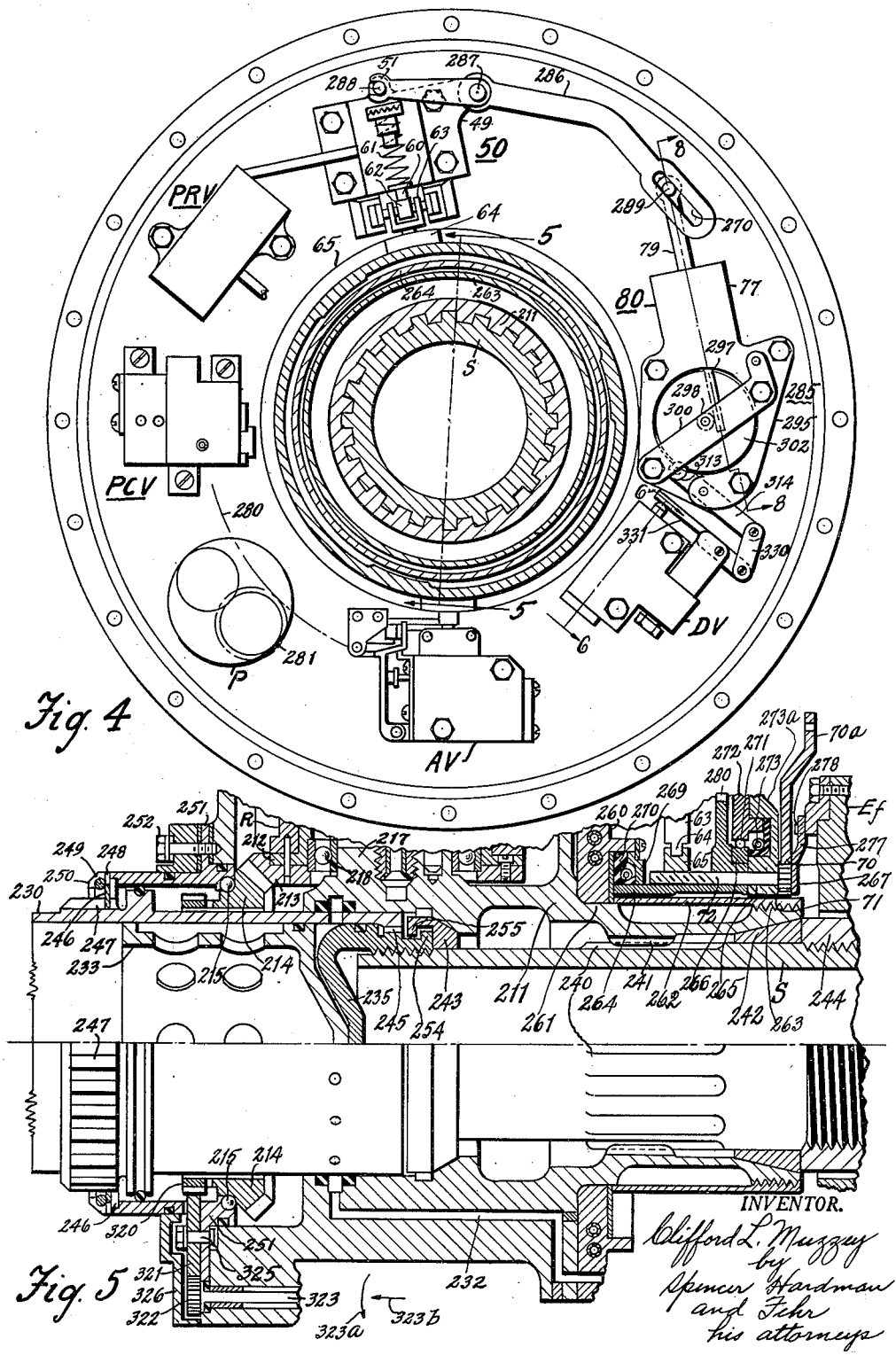

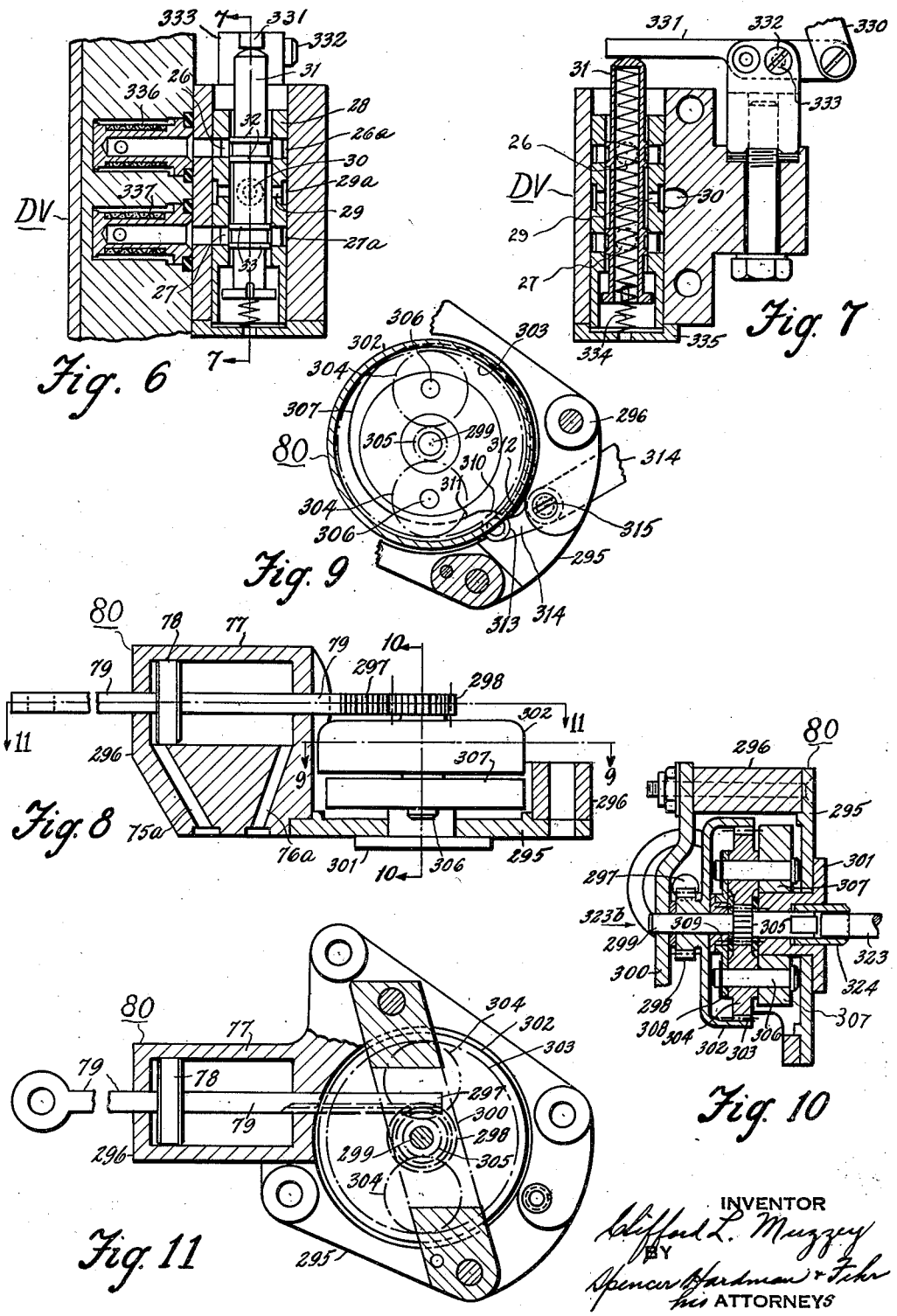

Patented Mar. 25, 1952

2,590,199

UNITED STATES PATENT OFFICE 2,590,199

PROPELLER PITCH CONTROL APPARATUS

Clifford L. Muzzey, Dayton, Ohio, assignor to General Motors Corporation, Detroit, Mich., a corporation of Delaware Application June 8, 1946, Serial No. 675,359

5 Claims. (Cl. 170—160.17)

This invention relates to apparatus for governing the speed of aircraft engines.

An object of the invention is to provide a governing system which is stable in operation. This object is accomplished by the use of hydraulic means under control by a valve which is under joint control by centrifugal force and by a spring opposing centrifugal force acting upon the valve, said spring being under control by a synchronizer which is used to maintain uniformity of the speeds of a plurality of engines on an airplane.

Further objects and advantages of the present invention will be apparent from the following description, reference being had to the accompanying drawings, wherein a preferred embodiment of the present invention is clearly shown.

In the drawings:

Fig. 4 is a sectional view on line 4—4 of Fig. 3.

Fig. 5 is a fragmentary sectional view taken chiefly on line 5—5 of Fig. 4.

Fig. 6 is a fragmentary sectional view on line 6—6 of Fig. 4.

Fig. 7 is a sectional view on line 7—7 of Fig. 6.

Fig. 8 is a sectional view on line 8—8 of Fig. 4.

Fig. 9 is a sectional view on line 9—9 of Fig. 8.

Fig. 10 is a sectional view on line 10—10 of Fig. 8.

Fig. 11 is a sectional view on line 11—11 of Fig. 8.

Figures 1, 2:
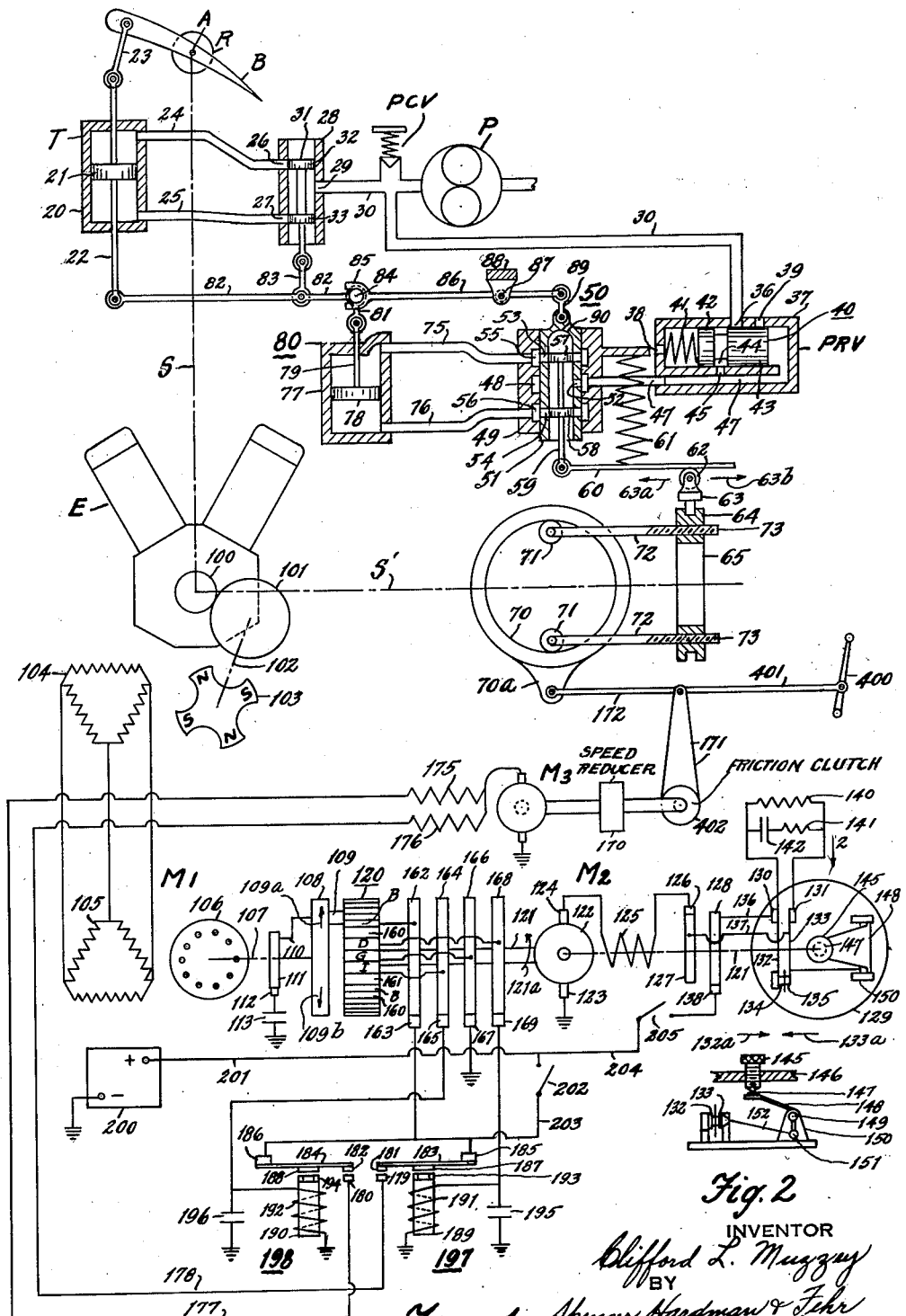
Fig. 1 is a diagram of the control system.
Fig. 2 is a fragmentary view in the direction of arrow 2 of Fig. 1 showing a portion of the apparatus for controlling the speed of the speed-setting electric motor of the synchronizer.

Referring to Fig. 1, the blade B represents all of the blades of a variable pitch propeller. Blade B has its root R mounted for angular adjustment about an axis represented by point A. Blade B is adjusted by a torque unit T comprising a cylinder 20 enclosing a piston 21 attached to a rod 22 connected by link 23 with the blade B. The ends of cylinder 20 are connected respectively by pipes 24 and 25 with outlet ports 26 and 27 respectively of a distributing valve body 28 having also an inlet port 29 connected by a pipe 30 with a pump P and with a pressure control valve PCV. The body of distributing valve DV receives a valve 31 having lands 32 and 33 for controlling ports 26 and 27 respectively.

Pipe 30 is connected by pipe 35 with port 36 of the cylinder 37 of a pressure reducing valve unit PRV. Cylinder 37 has a vent 38 and a drain port 39 and it receives a piston valve 40 urged right by a spring 41. Between the lands 42 and 43 of valve 40 there is an annular groove 44 providing for communication between port 36 and a port 45 connected with a passage 46 which leads to the right end of cylinder 37 and to an outlet pipe 47 which leads to the annular groove 48 in a valve body 49 of a control valve 50. The body 49 guides a tubular valve 51 having an inlet port 52 connected with groove 48 and having distribution ports 53 and 54 connected respectively with annular grooves 55 and 56 of the body 49. The control of the ports 53 and 54 is effected respectively by the lands 57 and 58 of a valve 59 which is urged upwardly (Fig. 1) by centrifugal force. Valve 59 is pivotally connected at its lower end with a lever 60 urged by a spring 61 against an adjustable fulcrum provided by roller 62 pivotally supported by a carriage 63 movable in the direction of arrow 63a for the purpose of increasing blade angle or in the opposite direction indicated by arrow 63b for decreasing blade angle. Carriage 63 carries a shoe 64 received by the groove of a ring 65 which is non-rotatable with the propeller hub while the apparatus, previously described, is rotatable therewith.

In the diagram, E designates the engine which drives the propeller whose blades are represented by letter B. A dot-dash line S represents the engine shaft on which the propeller hub is mounted. The line S' which extends at right angles to the line S in the diagram also represents the engine shaft and the axis of the propeller hub.

In a manner to be described, a ring gear 70 is rotatably supported concentrically of the engine shaft but is non-rotatable therewith. Gear 70 meshes with pinions 71 connected with shafts 72 provided with high lead screws 73 threadedly engaging the ring 65. Rotation of gear 70 effects movement of carriage 63 either in the direction of arrow 63a or 63b depending upon the direction of rotation of gear 70. The means for rotating gear 70 in either direction will be described later.

Grooves 55 and 56 of valve body 49 are connected respectively by pipes 75 and 76 with the ends of a cylinder 77 which receives a piston 78 attached to a rod 79, said elements comprising an auxiliary servo 80.

Rod 79 is connected by a short link 81 with the right end of a lever 82 whose left end is connected with piston rod 22 of torque unit T, and an intermediate portion of lever 82 is connected by link 83 with the lower end of valve 31. The pin 84, which provides the pivotal joint between the link 81 and the lever 82 is received by the fork 85 of a lever 86 pivotally supported at 87 by bracket 88 and connected by a link 89 with the sleeve valve 51 which is vented at 90.

Engine E drives a gear 100 meshing with a gear 101. Gear 101 is connected by a shaft 102 with a rotatable permanent magnet 103 of a tachometer generator whose delta-connected armature circuit 104 is connected with the delta-connected stator circuit 105 of a synchronous motor $M_1$ whose squirrel cage armature 106 drives a shaft 107 carrying a disc 108 which carries a brush 109 connected by wire 110 with a collector ring 111 engaged by brush 112 connected with a grounded condenser 113. Brush 109 engages the end faces of bars of a commutator 120 insulatingly supported by shaft 121 driven by a master D. C. motor $M_2$ whose armature 122 is connected through its commutator with a grounded brush 123 and with a non-grounded brush 124 connected with its series field winding 125 which is connected by a brush 126 with a collector ring 127 driven by shaft 121 which drives also a collector ring 128 and a disc 129 which supports the governor which controls the speed of the motor. For this purpose the disc 129, made preferably of insulating material, carries two metal posts 130 and 131 to which leaf spring blades 132 and 133 are attached. The blades 132 and 133 carry contacts 134 and 135 respectively which are in engagement with the motor on speed and which is below a certain value. Posts 130 and 131 are connected respectively by wires 136 and 137 with collector rings 128 and 127, the ring 128 being engaged by a brush 138. The posts 130 and 131 are paralleled by two circuits, one being a resistance 140 and the other being a resistance 141 in series with a condenser 142. The speed of the motor is governed by the intermittent opening and closing of the contacts 134 and 135 at a predetermined speed which is above the speed for which the governor is set. The contact 134 will separate from the contact 135 thereby opening the short circuit for the resistance 140 and thereby reducing energization of the field winding 125 whereupon the speed of the motor will decrease and the contacts will reclose. The function of the resistance 141 and the condenser 142 is to reduce sparking at the contacts of the governor.

The speed setting of the governor can be adjusted. The blade 132 is biased in the direction of arrow 132a while the blade 133 is biased in the direction of arrow 133a. The position of blade 133 is fixed by a speed adjusting screw 145 fixed to support 146 contacting a button 147 on a lever 148 attached to a shaft 149 pivotally supported by ears 150 attached to the disc 129. Shaft 149 carries a lever 151 connected by a link 152 with the blade 133. If screw 145 is so turned that it moves up in Fig. 2, blade 133 can move in the direction of arrow 133a against the bias of blade 132 in the direction of arrow 132a. This will increase the governed speed of the motor M. Likewise if the screw 145 is so turned that it moves down, the blade 133 will be moved toward the right and the blade 132 will follow it. This latter adjustment will effect a reduction of the governed speed of the motor.

The commutator 120 comprises a plurality of groups of bars, each group comprising in sequence the following: B, 160, D, G, I, 161 making six bars in each group. If the commutator has 30 bars, there will be five groups. All of the B bars are connected together and with a collector ring 162 engaged by a brush 163; all of the D bars are connected together and with a collector ring 168, engaged by a brush 169; all of the G bars are connected together and with a collector ring 166 engaged by brush 167; and all of the I bars are connected together and with a collector ring 164 engaged by a brush 165. The collector rings are supported by the shaft 121. Shaft 121 rotates in the direction of arrow 121a. When the engine E is operating at the speed demanded by the synchronizer, there will be no relative rotation between the brush 109 and the commutator 120. If the engine exceeds the speed demanded by the synchronizer, brush 109 will rotate relative to the commutator 120 in the direction of arrow 109a. Therefore brush 109 will make contact with bars B and I in sequence for the purpose of effecting an increase of blade angle in order to reduce engine speed. If the speed of the engine is below the speed demanded by the synchronizer, brush 109 will rotate relative to the commutator 120 in the direction of arrow 109b and will engage bars B and D in sequence for the purpose of effecting a decrease of blade angle in order to permit increase of engine speed. The adjustment of gear 70 for the purpose of increasing or decreasing blade angle is effected by an electric servo motor $M_3$ which, through a reduction gearing 170, operates a lever 171 connected by link 172 with ring gear 70. When lever 171 rotates counterclockwise, gear 70 rotates clockwise and causes the screws 73 to rotate in the same direction as viewed from the right, thereby causing ring 65 to move in the direction of arrow 63b in order to decrease blade angle. Conversely, when lever 171 moves clockwise, ring 65 moves toward the left to increase the blade angle. Motor $M_3$ is a reversible motor and is therefore provided with two field windings 175 and 176 oppositely wound in order to provide for flux reversal. Field windings 175 and 176 are connected respectively by wires 177 and 178 with the stationary contacts 180 and 179 of relays 198 and 197. Contacts 179 and 180 engage respectively contacts 181 and 182 mounted on blades 183 and 184 respectively, fixed to terminals 185 and 186 respectively. Blades 183 and 184 carry armatures 187 and 188 respectively, facing cores 189 and 190 respectively, surrounded by magnet coils 191 and 192 respectively, and damping or shading coils 193 and 194 respectively which are short-circuited. Magnet coils 191 and 192 respectively are paralleled by condensers 195 and 196 respectively. A current for operating the relays 197 and 198 and the motors $M_3$ and $M_2$ is provided by a storage battery 200 connected by wire 201, switch 202, wire 203 with terminals 185 and 186. Wire 201 is connected by wire 204 and switch 205 with brush 138. Brush 163 is connected with wire 203, brush 165 with magnet coil 192, brush 167 is grounded, brush 169 is connected with magnet coil 191.

Assuming that there is an overspeed error, brush 109 will contact bars B and I in sequence. Whenever brush 109 contacts bars B, condenser 113 will be charged through the following circuit: Battery 200, wire 201, closed switch 202, wire 203, brush 163, ring 162, bar B, brush 109, conductor 110, ring 111, brush 112, condenser 113. Whenever the I bars are next engaged by the brush 109, the condenser 113 is discharged through the following circuit: Condenser 113, brush 112, ring 111, conductor 110, brush 109, bars I, ring 164, brush 165, magnet coil 192, whereupon contacts 180 and 182 will be closed and the following circuit will be established to the field coil 175 of motor M3: Battery 200, wire 201, closed switch 202, wire 203, terminal 186, contacts 182, 180, wire 177, field coil 175, thereby causing the lever 171 to rotate clockwise to effect increase of blade angle in order to permit engine speed to decrease. The grounded bars G are placed between bars D and I in order to prevent conflicting operations of the relays 197 and 198. The condensers 195 and 196 and the shading coils 193 and 194 provide for lags in the relays 197 and 198 so that when speed error exceeds a certain value, one or the other of the field coils of motor M3 will be continuously connected with the battery. As speed error decreases, the time intervals between the discharges of condenser 113 increase and finally these intervals are greater than the time lag constants of the relay so that the relays operate intermittently. As the engine speed approaches the synchronizer speed, the frequency of the operation of a relay diminishes so that there is less likely to be an overcorrection of blade angle.

Any suitable synchronizer could be used to operate the ring gear 70 which shifts the roller 62. The synchronizer which is disclosed herein is like the one which is disclosed in the copending application of James W. Light, Serial No. 624,513, filed October 25, 1945, now Patent No. 2,501,228, issued March 21, 1950. When there is a speed error, over-speed $n$ for example, valve 59 moves up from equilibrium position shown in Fig. 1 to cause pressure fluid to enter port 53 to cause piston 78 to move down. Overspeed error causes roller 62 to move left due to the action of the synchronizer thereby decreasing the ability of the spring 61 to oppose centrifugal force. Therefore, in order to balance centrifugal force, spring 61 must be compressed further than would be the case if roller 62 had not moved left in consequence of the speed error. Valve 59 moves up a distance which is due to speed error without attendant movement of roller 62 to the left plus a distance required to cause the spring 61 to be compressed further as result of left movement of roller 62. Displacement of valve 59 upwardly as result of overspeed error $n$ without attendant movement of roller 62 is in proportion to the amount of speed $n$; and displacement of valve 59 upwardly, in order further to compress spring 61 to cause it to balance centrifugal force when roller 62 moves left, is in proportion to integrated speed error, $\int n\,dt$. The displacement of valve 59 is in proportion to $n$ and $\int n\,dt$.

As valve 59 moves up, piston 78 moves down until valve 51 moves up to bring its ports 53 and 54 into alignment with lands 57 and 58, respectively, of valve 59. As piston 78 moves down, valve 31 moves down to connect ports 29 and 27. Piston 21 moves up until it causes valve 31 to move up sufficiently to bring its lands 32 and 33 into alignment with ports 26 and 27, respectively. The displacement of piston 78 conforms to the displacement of valve 59 and the displacement of piston 21 conforms to the displacement of piston 78. Therefore, the displacement of piston 21 conforms to displacement of valve 59. When overspeed error has been reduced to zero, left movement of roller 62 ceases. The equilibrium position of valve 59 is above (in Fig. 1) that which it had occupied before the overspeed error; piston 78 stops at a position below that which it had occupied before the overspeed error; and piston 21 stops at a position above that which it had occupied before the overspeed error. The propeller blades are displaced in conformity to the displacement of piston 21 which is in conformity to the displacement of valve 59. Therefore, the amount of blade angle change is in proportion to $n$ and $\int n\,dt$; and the rate of blade angle change is in proportion to the rate of change of speed error ($n$) and to the amount of speed error ($\dot n$). This stability of governing action is effected.

When there is an underspeed error, the movements of the parts take place in directions which are opposite to those mentioned in the preceding paragraph. For example, if it is desired to increase the speed of the engines which are coordinated by the synchronizer, the knob 145 is turned in the direction required to increase the speed of the motor M2. So long as commutator 120 is rotating faster than brush 109, motor M3 will operate to effect a right movement of roller 62 a distance proportionate to integrated underspeed. Spring 61 becomes more effective to oppose centrifugal force and valve 59 moves down to open port 54. Piston 78 moves up and valve 31 moves up to open port 26. Piston 21 moves down to decrease blade angle to allow the engine to operate at higher speed. When the ports are in equilibrium for the higher speed setting of the synchronizer, valve 59 is in a position lower than that represented in Fig. 1 and valve 51 has been moved down by upward movement of piston 78 so as to bring its ports into alignment of the lands of valve 59 and valve 31 has been moved down by downward movement of piston 21 to bring its lands into alignment with the ports of valve guide 28.

During the time of correction of any speed error, valve 59 has an amount of displacement from its position before the occurrence of the speed error, which amount is the resultant of two components, one being in proportion to integrated speed error and the other component being in proportion to the amount of speed error. While speed error changes, the displacement of valve 59 from original position due to change of position of roller 62 takes place at a rate in proportion to the amount of speed error, the rate of displacement of valve 59 being minimum when speed error is minimum and maximum when speed error is maximum. While speed error changes, the displacement of valve 59 from original position due to change in the value of centrifugal force acting thereon is in proportion to the amount of speed error, and the rate of said displacement is in proportion to the rate of change of speed error. Since flow of pressure fluid to the auxiliary servo 80 is under control by valve 59 and by valve 51 operated by the piston 78 of servo 80, piston 78 has a rate of displacement in proportion to speed error and to the rate of change of speed error. Since valve 31 is under control by piston 78 and piston 21 of servo T, piston 21 is displaced at a rate in proportion to speed error and to the rate of change of speed error. Therefore, the rate of blade angle change is in proportion to speed error and to the rate of change of speed error.

Figure 3:
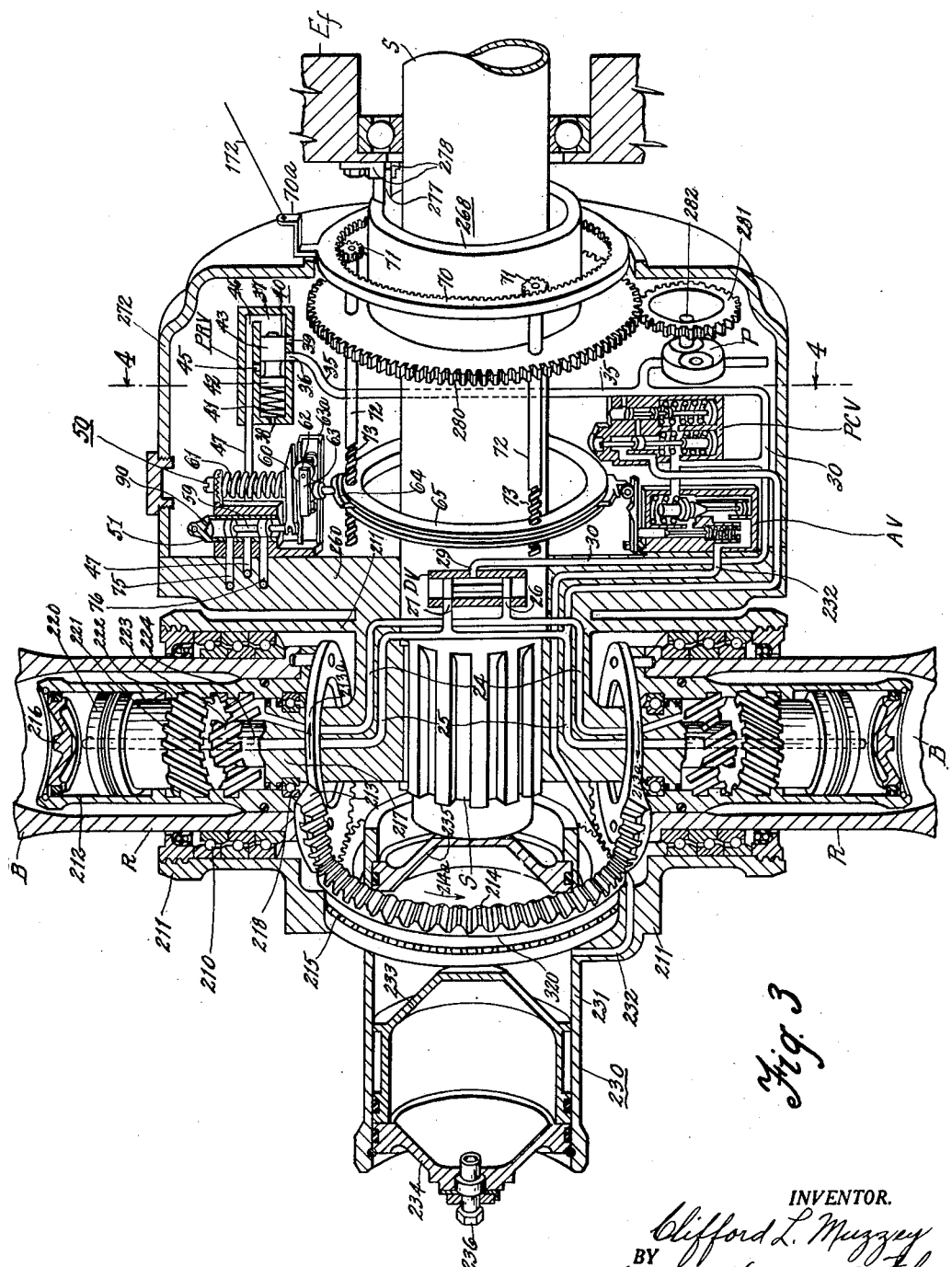
Fig. 3 is a longitudinal, sectional view in perspective (somewhat diagrammatic) showing a propeller hub assembly which includes a portion of the apparatus shown in Fig. 1.

A structural embodiment of the apparatus shown diagrammatically in Fig. 1 is disclosed in Figs. 3 through 11. Referring to Fig. 3, the root R of each blade B is rotatably supported by bearings 210 provided by a propeller hub or frame 211 attached to the engine shaft S which is rotatably supported by engine frame E$f$. Each blade root is attached to a cylinder 212 connected with a blade gear segment 213 and all of the segments 213 mesh with an equalizing bevel gear 214 supported by a ball bearing 215 carried by the hub 211. Each cylinder 212 is closed at its outer end by a plate 216 and at its inner end by an extension 217 of the hub 211, said part 217 carrying a bearing 218 on which the piston 212 is rotatable. Each piston 212 receives a piston 220 having external helical splines 221 meshing with internal helical splines 222 of the cylinder; and each piston is provided with internal helical splines engaging external helical splines 223 of a member 224 extending from the hub portion 217. The construction of the helical splines is such that when pressure fluid is admitted to the outer ends of cylinders 212, the blades will be rotated in a direction to increase pitch; and, when pressure fluid is admitted to the inner ends of the cylinder, blade angle will be decreased. Accordingly, the pipes 25, corresponding to the pipe 25 of Fig. 1, are connected with the distributing valve port 27 of distributing valve DV and pipes 24 are connected with the distributing port 26 of the distributor valve DV. The inlet port 29 of the distributing valve DV is connected by pipe 30 with pump P and pressure control valve PCV is connected with pipe 30 as shown in Fig. 1.

For the purpose of feathering and unfeathering of the blades, an accumulator 230 is provided. Its cylinder 231 is connected by pipe 232 and accumulator control valve AV with pipe 30. Cylinder 231 is supported by the propeller hub 211 and receives a piston 233 which is movable between the cylinder ends 234 and 235. The pump P forces pressure fluid through valve AV, passage 232 into cylinder 231, causing piston 233 to move left against the resistance of compressed gas forced into the cylinder 231 through a check valve 236.

The details of valves AV and PCV are disclosed in the copending application of David A. Richardson, Serial No. 616,808, filed September 17, 1945, now Patent No. 2,505,206, issued April 25, 1950.

Fig. 3 is somewhat diagrammatic. For details of the engine shaft S and associated parts, reference is made to Fig. 5 which shows longitudinal splines 240 provided by shaft S and engaging longitudinal splines 241 provided by hub 211 which is wedged between rings 242 and 243 of wedge shaped cross section, the former being stopped by a shoulder 244 screwed to the shaft S and the latter being forced toward the former by turning the accumulator end wall 235 which is threadedly connected with shaft S. The wall 235 is rotated by turning the cylinder 231 which is splinedly connected at 245 with the wall 235. The cylinder 231 is secured against rotation by a washer 246 internally notched to receive splines 247 in the exterior of the cylinder 231 and the washer 246 is provided with tangs 248 received by certain notches 249 in the flange 250 of a part 251 forming an extension of the hub 211, said part being attached to hub 211 by screws 252. The part 251 supports ball bearing 215 instead of the hub itself as shown in Fig. 3. The unscrewing of the wall 235 by the cylinder 231 effects retraction of the wedge ring 243 by virtue of the engagement of a flange 254 of wall 235 with a flange 255 of ring 243. Obviously, in order to assemble these parts, it is necessary that the ring 243 be made in two parts abutting diametrically.

In Fig. 3, the hub 211 is shown as being integral with a plate 260. Actually the plate 260 is a separate member which, as shown in Fig. 5, is provided with a central opening which receives a cylindrical boss 261 of the hub 211. Plate 260 is secured in position by a tubular nut 262 threadedly engaging the hub at 263. Surrounding the nut 262 there is a non-rotatable structure comprising ring 264, ring 265 and ring 267 which are secured together in any suitable manner to provide in effect a single ring indicated at 268, Fig. 3. The left end of ring section 264 fits within a bearing member 269 and a bearing seal 270 carried by the plate 260. The ring section 265 carries the inner race 266 of a ball bearing 271 carried by a cover or housing 272, separate from plate 260, as shown in Fig. 3, but attached thereto. Ring section 265 is located within a bearing seal 273 carried by a ring 273a attached to the housing 272. Plate 260, housing 272 and the ring sections comprising the assembly 268 of Fig. 3 provide a reservoir for containing hydraulic fluid and the various hydraulic instruments shown in Fig. 1. The assembly 268, Fig. 3, of the parts 264, 265 and 267 (Fig. 5) are non-rotatable. For this purpose, the part 267 is provided with a tongue 277 which fits, as shown in Fig. 3, between two lugs 278 attached to the engine frame Ef. Between the parts 266 and 267, the ring gear 70 is located with its handle 70a exterior to the construction so that it is accessible for operation by the rod 172 of Fig. 1 or by other means to be described. The ring section 265 provides a stationary gear 280 meshing with a smaller gear 281 (Fig. 4) attached to the drive shaft 282 of pump P. As the engine shaft S rotates the pump P orbitally, gear 281 rotates and drives the pump.

Fig. 4 shows a right side view of the plate 260 with various instruments located thereon, namely: Pump P, pressure control valve PCV, pressure reducing valve PRV, valve unit 50, unit 80 and its associated differential mechanism 285 performing the functions of lever 82 of Fig. 1, the distributing valve DV and the accumulator control valve AV, all of which are hydraulically connected in the manner indicated in Figs. 1 and 3. There are, however, certain differences in the mechanical connections between the various hydraulic units. Instead of a lever 86 of Fig. 1, there is a lever 286 which is pivotally supported at 287 by the body 49 of unit 50. The left arm of lever 286 is connected with valve 51 through a stud 288 connected with the valve and received by the forked end of the lever. Lever 286 is connected with the piston rod 79 of unit 80 by providing the latter with a pin 289 received by a slot 290 provided by lever 286. The shape of this slot may be used to determine the degree of stabilization which is present in the system. The piston rod 79 of unit 80 conditions the distributing valve DV for blade angle change; and blade angle change returns the distributing valve to neutral position as disclosed diagrammatically in Fig. 1. However, the mechanism is different. There is provided a differential unit 285 which will now be described.

Unit 285 comprises a base 295, Figs. 8 through 11, which is attached to plate 260. Base 295 is attached to a frame 296 which provides the cylinder 77 enclosing the piston 78 connected with piston rod 79 as shown in Fig. 1. Frame 296 provides portions 75a and 76a of pipes 75 and 76 of Fig. 1, other portions of these pipes being provided by the plate 260 to which the frame 296 is attached. Piston rod 79 provides a rack 297 engaging a pinion 298 loosely journaled on a shaft 299, Fig. 10, supported at its left end by a bar 300 attached to the frame 296 and at its right end by a bushing 301 attached to the base 295. Pinion 298 is connected with a cup 302 providing a ring gear 303 meshing with planetary gears 304, meshing with a sun gear 305, attached to shaft 299. Planetary gears 301 revolve on pins 306 attached to a plate 307 journaled on bushing 301; said pins passing through a plate 308 journaled on a ring 309 surrounding the shaft 299. Plate 307 provides a cam rise 310 extending between an inner land 311 and an outer land 312. This cam is engaged by a roller 313 on a lever 314 pivotally supported at 315 by the frame 296 and operatively connected with distributing valve DV, said lever having functions equivalent to those of link 83 in Fig. 1.

When there is a movement of piston 78 to effect through gear train 297, 298, 303, 304, a rotation of plate 307 in either direction from the neutral position shown in Fig. 9, there will be a displacement of valve 31 of distributing valve DV from neutral position to effect a blade angle change. In response to the blade angle change, the plate 307 is moved in a direction opposite to that at which it had been moved by piston 78 for the purposes aforesaid. This is effected by a mechanism which comprises a gear 320, Figs. 3 and 5, connected with equalizing gear 214 and meshing with an idle gear 321 (Fig. 5, bottom left) meshing with a gear 322 attached to a shaft 323 extending from front toward the rear of the propeller hub and connected, as shown in Fig. 10, by a coupling 324 with shaft 299. The part 251, Fig. 5, forming an extension of the housing 211, provides a pivot stud 325 for the gear 321 and gears 321 and 322 are closed by a cover 326 attached to the part 251. If, for example, piston 78 moves down, Fig. 1, or right, Figs. 8 and 11, rack 297 moves right, Fig. 11, pinion 298 rotates clockwise; gear 303 rotates clockwise in Fig. 9 and plate 307 moves clockwise to bring the outer land 312 into contact with the roller 313, thereby causing lever 314 to rotate counterclockwise.

The lever 314 is connected by link 330 with a lever 331, pivoted at 332 on a bracket 333 attached to the body of the distributing valve DV. Therefore counterclockwise movement of lever 314 effects counterclockwise movement of lever 331, thereby causing valve 31 to move down in Fig. 7, against the action of a spring 334 located within said valve and confined between its inner and upper end wall and plate 335 attached to the valve body. This causes the valve 31 to move down, thereby connecting passage 30 with port 27, thereby causing blade angle to increase. As stated before, when port 29 is connected with port 27, pressure fluid flows through pipe 25 to the outer ends of the cylinder 212, Fig. 3, thereby causing the pistons 220 to move down. This effects rotation of gear segments 213 in the direction of arrows 213a, Fig. 3, and rotation of gear 214 in the direction of arrow 214a. Therefore, referring to Fig. 5, shaft 323 rotates counterclockwise as indicated by arrow 323a as viewed in the direction of arrow 323b. Since Fig. 9 is seen in the direction of arrow 323b (Fig. 5 and also Fig. 10), gear 305 will rotate counterclockwise as viewed in Fig. 9, thereby causing the planet gears 304 to rotate clockwise. Ring gear 303, being stationary, the pins 306 and the plate 307 rotate counterclockwise, thereby causing the cam 310 to be restored to neutral position as shown in Fig. 9, said return being effected when the demanded blade angle change to increase pitch, has been made. If there were a demand for decrease in blade angle, the parts mentioned in the preceding paragraph would move in the opposite directions. In any event when the lever 314 returns to neutral position under the action of spring 334, valve 31 returns to the position closing both of the distributing ports 26 and 27. Thus the differential mechanism 285 performs the function of the lever 82 and associated parts shown in Fig. 1.

Between the port 26 and the pipe 24 (Fig. 3) there is located a filter 336 (Fig. 6); and between the port 27 and pipe 25 (Fig. 3) there is located a filter 337 (Fig. 6). Other pipe connections may include filters wherever necessary.

Any one of the several engines coordinated by the synchronizer can be manually controlled by a manual override lever 400 connected with link 172 by a link 401 provided a friction clutch 402 is located between lever 171 and the speed reducer unit 170.

While the embodiment of the present invention as herein disclosed, constitutes a preferred form, it is to be understood that other forms might be adopted, all coming within the scope of the claims which follow.

What is claimed is as follows:

1. In an engine-propeller combination, apparatus for controlling propeller blade angle to effect propeller rotation at a selected speed, the combination comprising, a hub rotatable by the engine, pitch shiftable blades journalled in the hub, blade angle control means for the blades including a fluid pressure servo-motor and a source of fluid under pressure within the hub, said servo-motor having a displacement member operatively connected with the blades to rotate them about their root-axes; a distributing valve for controlling the admission of pressure fluid to either side of said displacement member; an auxiliary hydraulic servo-motor having a displacement member; a mechanism for effecting control of the distributing valve by the displacement members of both servo-motors; means for controlling admission of pressure fluid to either side of the displacement member of the auxiliary servo-motor and including a ported sleeve valve operated by the displacement member of the auxiliary servo and including a valve plunger controlling the ports of the sleeve valve, the valve plunger being subjected to the action of centrifugal force, a spring for opposing the action of centrifugal force upon the valve plunger, and means for varying the effectiveness of the spring in accordance with integrated speed error, whereby the valve has a displacement in accordance with the amount of speed error due to change in centrifugal force, and whereby the valve has a displacement in accordance with integrated speed error due to change in the effectiveness of the spring.

2. In an engine-propeller combination, apparatus for controlling propeller blade angle to effect propeller rotation at a selected speed, the combination, comprising, a hub rotatable by the engine, pitch shiftable blades journalled in the hub, blade angle control means for the blades including a fluid pressure servo-motor and a source of fluid under pressure within the hub, said servo-motor having a displacement member operatively connected with the blades to rotate them about their root-axes; a distributing valve for controlling the admission of pressure fluid to either side of said displacement member; an auxiliary hydraulic servo-motor having a displacement member, a mechanism for effecting control of the distributing valve by the displacement members of both servo motors, means for controlling admission of pressure fluid to either side of the displacement member of the auxiliary servo-motor and including a ported sleeve valve operated by the displacement member of the auxiliary servo, and including a valve controlling the ports of the sleeve valve, a lever connected with the valve, a fulcrum for the lever, a spring for urging the lever upon the fulcrum and opposing the action of centrifugal force upon the valve, and means for shifting the fulcrum in accordance with integrated speed error in order to vary the effectiveness of said spring in accordance with integrated speed error whereby the valve has a displacement in accordance with the amount of speed error due to change in centrifugal force and whereby the valve has a displacement in accordance with integrated speed error due to change in the effectiveness of the spring.

3. In an engine-propeller combination, apparatus for controlling propeller blade angle to effect propeller rotation at a selected speed, the combination comprising, a hub rotatable by the engine, pitch shiftable blades journalled in the hub, blade angle control means for the blades including a fluid pressure servo-motor and a source of fluid under pressure within the hub, means for so controlling the admission of pressure fluid to said servo-motor that blade angle changes in accordance with amount of speed error and in accordance with the rate of change of speed error, said means including a distributor valve, a control valve subjected to the action of centrifugal force, a lever connected with the control valve, a fulcrum for the lever, a spring for urging the lever upon the fulcrum and opposing the action of centrifugal force upon the control valve, a porting sleeve cooperable with the control valve and having an articulated linkage with said distributor valve, an auxiliary hydraulic servo-motor having a displacement member for actuating the articulated linkage, and means dependent upon the action of the control valve and the porting sleeve for actuating the displacement member of the auxiliary servo-motor, an electric servo-motor for shifting the fulcrum of the control valve, and means for effecting operation of the last mentioned servo-motor in accordance with integrated speed error in order to vary the effectiveness of said spring in accordance with integrated speed error, whereby the valve has a displacement in accordance with the amount of speed error due to change in centrifugal force and whereby the valve has a displacement in accordance with integrated speed error due to change in the effectiveness of the spring.

4. In an engine-propeller combination, apparatus for controlling propeller blade angle to effect propeller rotation at a selected speed, the combination comprising, a hub rotatable by the engine, pitch shiftable blades journalled in the hub, blade angle control means for the blades including a fluid pressure servo-motor and a source of fluid under pressure within the hub, said servo-motor having a displacement member operatively connected with the blades to rotate them about their axes, a distributing valve for controlling the admission of pressure fluid to either side of said displacement member, an auxiliary hydraulic servo-motor having a displacement member, a mechanism for effecting control of the distributing valve by the displacement members of both the motors, means for controlling admission of pressure fluid to either side of the displacement member of the auxiliary servo-motor and including a ported sleeve valve operated by the displacement member of the auxiliary servo, and including a valve plunger controlling the ports of the sleeve valve, the valve plunger being under the action of centrifugal force, a lever connected with the valve, a fulcrum for the lever, a spring for urging the lever upon the fulcrum and opposing the action of centrifugal force upon the valve plunger, an electric servo-motor for shifting the fulcrum, and means for effecting operation of the last mentioned servo-motor in accordance with integrated speed error in order to vary the effectiveness of said spring in accordance with integrated speed error, whereby the valve plunger has a displacement in accordance with the amount of speed error due to change in centrifugal force, and whereby the valve plunger has a displacement in accordance with integrated speed error due to change in the effectiveness of the spring.

5. In an engine-propeller combination, apparatus for controlling propeller blade angle to effect propeller rotation at a selected speed, the combination comprising, a hub driven by the engine and rotatably supporting pitch shiftable blades, blade angle control means for adjusting the blades and including a double acting fluid pressure blade actuating servo-motor and a source of fluid pressure, a distributor valve for selectively energizing the blade actuating servo, a control valve having a movable plunger and movable porting sleeve for the control of the distributor valve, manual means operating on the control valve for initially setting the control valve to control at a selected speed, master speed means for modifying the setting of the control means in accordance with any speed error between the speed of propeller operation and the speed of the master speed means, said control valve being connected with the speed setting means through a lever and a spring acting upon the plunger and a carriage movable by the speed setting means, whereby an equilibrium position of the plunger and porting sleeve is attained on balance of centrifugal force and spring force, said plunger responding for any speed error correction in proportion to the integrated speed error and in proportion to the amount of speed error, an auxiliary servo-motor transmitting to the distributor valve the control applied by the control valve, and operable in conjunction with the blade actuating servo to shift the porting sleeve to a new equilibrium relation with the movable plunger, whereby the rate of blade angle change is in proportion to the speed error and in proportion to the rate of change of speed error.

CLIFFORD L. MUZZEY.

REFERENCES CITED

The following references are of record in the file of this patent:

UNITED STATES PATENTS

| Number | Name | Date |
| --- | --- | --- |
| 2,319,218 | Drake | May 18, 1943 |
| 2,360,792 | Putnam | Oct. 17, 1944 |
| 2,375,429 | Martin | May 18, 1945 |
| 2,391,323 | Martin | Dec. 18, 1945 |
| 2,399,685 | McCoy | May 7, 1946 |
| 2,403,532 | Hoover | July 9, 1946 |
| 2,423,191 | Kopp | July 1, 1947 |
| 2,451,059 | Blanchard et al. | Oct. 12, 1948 |